(12) United States Patent
Bernhardt

(10) Patent No.: US 9,504,241 B2
(45) Date of Patent: Nov. 29, 2016

(54) APPARATUS FOR CAPTURING FRUIT FLIES

(71) Applicant: Michael Bernhardt, Buffalo, NY (US)

(72) Inventor: Michael Bernhardt, Buffalo, NY (US)

(*) Notice: Subject to any disclaimer, the term of this patent is extended or adjusted under 35 U.S.C. 154(b) by 107 days.

(21) Appl. No.: 14/573,110

(22) Filed: Dec. 17, 2014

(65) Prior Publication Data

US 2015/0173340 A1 Jun. 25, 2015

Related U.S. Application Data

(60) Provisional application No. 61/918,028, filed on Dec. 19, 2013.

(51) Int. Cl.
*A01M 1/02* (2006.01)
*A01M 1/10* (2006.01)

(52) U.S. Cl.
CPC ............... *A01M 1/106* (2013.01); *A01M 1/02* (2013.01)

(58) Field of Classification Search
CPC ......... A01M 1/02; A01M 1/106; A01M 1/12
See application file for complete search history.

(56) References Cited

U.S. PATENT DOCUMENTS

| | | | |
|---|---|---|---|
| 4,332,100 A | 6/1982 | Schneider | |
| 4,625,453 A | 12/1986 | Smith | |
| 5,116,219 A | 5/1992 | Zimmerman | |
| 5,222,322 A | 6/1993 | Mastromonaco | |
| 5,241,779 A | 9/1993 | Lee | |
| 5,915,950 A | 6/1999 | Kleinhenz | |
| 6,209,256 B1 * | 4/2001 | Brittin | A01M 1/023 43/107 |
| 6,568,125 B2 | 5/2003 | Kleinhenz | |
| 6,655,080 B2 | 12/2003 | Spiro et al. | |
| 7,805,882 B2 | 10/2010 | Wolf | |
| 8,109,036 B1 | 2/2012 | Wilbanks | |
| 2004/0025412 A1 * | 2/2004 | Simchoni | A01M 1/023 43/107 |
| 2011/0056118 A1 | 3/2011 | Miller et al. | |
| 2011/0283597 A1 | 11/2011 | Coventry | |
| 2012/0066958 A1 | 3/2012 | McGinnis, Jr. | |
| 2015/0289497 A1 * | 10/2015 | Bennett | A01M 1/106 43/107 |
| 2016/0021864 A1 * | 1/2016 | Koo | A01M 1/04 43/113 |

* cited by examiner

*Primary Examiner* — Christopher P Ellis
*Assistant Examiner* — Michael Wang
(74) *Attorney, Agent, or Firm* — Hamilton, Brook, Smith & Reynolds, P.C.

(57) ABSTRACT

Disclosed herein is a trap for flying pests that does not require the use of chemicals and can be packaged in such a way that it can be present in public areas without being unsightly or intrusive. The trap is reusable, easy to set up, easy to clean, and easy to operate. An example trap includes an outer wall containing a solution, an inner wall extending into the solution, and a space formed between the outer wall and the inner wall. The trap also includes an air pump and one or more air supply conduits that supply air from the air pump to the solution. The air forms bubbles in the solution that rise in the space formed between the outer wall and the inner wall and that cascade downward within the inner wall and into the solution. The cascading bubbles serve to capture flies that land on the bubbles and retain the flies within the trap.

11 Claims, 5 Drawing Sheets

APPARATUS FOR CAPTURING FRUIT FLIES

RELATED APPLICATION

This application claims the benefit of U.S. Provisional Application No. 61/918,028, filed on Dec. 19, 2013. The entire teachings of the above application are incorporated herein by reference.

BACKGROUND OF THE INVENTION

Fruit flies contaminate food, wreak havoc on the liquor stores of bars and restaurants, and destroy crops; costing money in wasted product and lost produce. Conventional methods for attempting to remove these pests often employ toxic chemicals and physical traps, such as, for example, dangling adhesive tapes. While these methods may successfully remove some flies from a local environment, they also have downsides. In a business environment, especially for a food service, a dangling tape of dead flies is neither sanitary nor something that should be observed by the clientele. In the case of chemical traps, toxic chemicals pose health risks if not handled or disposed properly.

SUMMARY OF THE INVENTION

Disclosed herein is a trap for flies (e.g., fruit flies) that does not require the use of chemicals and is capable of being packaged in such a way that it could be present in public areas without being unsightly or intrusive. The trap also isolates the trapped flies in a container, separating them from the outside environment completely, unlike traditional traps and tapes. In addition, traditional trap systems generally must be disposed and replaced. The disclosed trap, on the other hand, is reusable, easy to set up, easy to clean, and easy to operate.

One example fly trap includes an outer wall containing a solution, an inner wall extending into the solution, and a space formed between the outer wall and the inner wall. The trap also includes an air pump and one or more air supply conduits that supply air from the air pump to the solution. The air forms bubbles in the solution that rise in the space formed between the outer wall and the inner wall and that cascade downward within the inner wall and into the solution.

Some example traps may also include one or more air stones to aide in forming the bubbles. The air stones are coupled to the ends of the one or more air supply conduits and are located within the solution. Other example traps may include a plate with multiple holes to aide in forming the bubbles. The plate is located within the solution and above the ends of the one or more air supply conduits, and can include a hole through which the lower end of the inner wall can extend to allow captured flies to be deposited in the solution. Other example traps may include an air passage with multiple holes to aide in forming the bubbles. The air passage is coupled to an end of the one or more air supply conduits and runs around the perimeter of the outer wall in the space formed between the outer wall and the inner wall.

Some example traps can include a screen located in the solution above the lower end of the inner wall and below the ends of the one or more air supply conduits. The screen retains captured flies below the screen, and can include a hole through which the lower end of the inner wall extends to allow the captured flies to be deposited below the screen. Other example traps can include a mesh layer located at the bottom of the solution that can retain any captured flies.

In many embodiments, the outer wall extends above the inner wall and is angled toward the inner wall to direct bubbles rising in the space formed between the outer wall and the inner wall toward the inner wall. Further, many embodiments can include outer and inner walls that are cylindrically shaped, but the fly traps contemplated herein are not limited to such a shape.

Another example fly trap includes a container with a solution therein, a wall at one end of the container, and an angled surface located within the container and extending into the solution. A space is formed between the wall and the angled surface. The example fly trap also includes an air pump and one or more air supply conduits that supply air from the air pump to the solution. The air forms bubbles in the solution that rise in the space formed between the wall and the angled surface and that cascade downward along the angled surface and into the solution.

The disclosed traps operate by creating a cascading wall of bubbles that flies appear to view as a solid surface, and when the flies attempt to land on the cascading wall of bubbles, the bubbles pop and secure the flies. The wall of bubbles continues to slide down into the trap (e.g., the inside of a round trap or down a slanted wall of a flat trap, for example) until the secured flies and remaining bubbles reach the bait/bubble solution. The bait/bubble solution continually circulates creating a moving body of bubbles (e.g., like a conveyer belt, for example), which returns back to the original location and becomes liquid again to make more bubbles. As flies land on the moving body of bubbles, the bubbles pop, entrapping the flies in the moving body of bubbles, which continues back to the bubble/bait reservoir where the flies drown and are collected until the trap is rinsed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The disclosed traps operate by creating a cascading wall of bubbles that flies (e.g., fruit flies) appear to view as a solid surface, and when the flies attempt to land on the cascading wall of bubbles, the bubbles pop and secure the flies. The wall of bubbles continues to slide down into the trap (e.g., down a slanted wall 115 of a flat trap 100 as shown in FIG.

Figure 2:
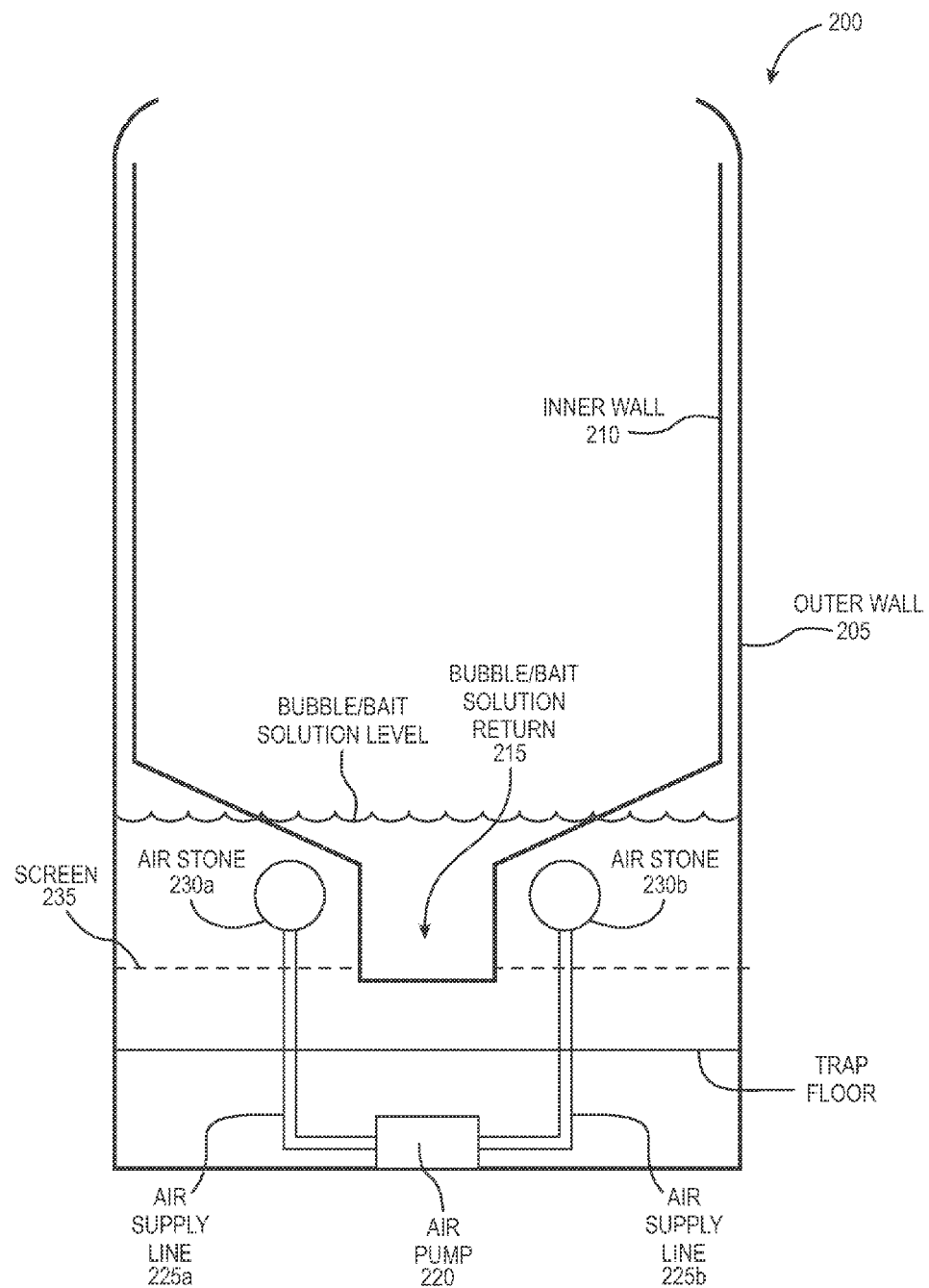
FIG. 2 is a schematic drawing of a fly trap, according to another example embodiment of the present invention.

1, or down the inside 210 of a round trap 200 as shown in FIG. 2, for example) until the secured flies and remaining bubbles reach the bait/bubble solution. The bait/bubble solution continually circulates creating a moving body of bubbles (e.g., like a conveyer belt, for example), which returns back to the original location and becomes liquid again to make more bubbles. As flies land on the moving body of bubbles, the bubbles pop, entrapping the flies in the moving body of bubbles, which continues back to the bubble/bait reservoir where the flies drown and are collected until the trap is rinsed.

Figure 1:
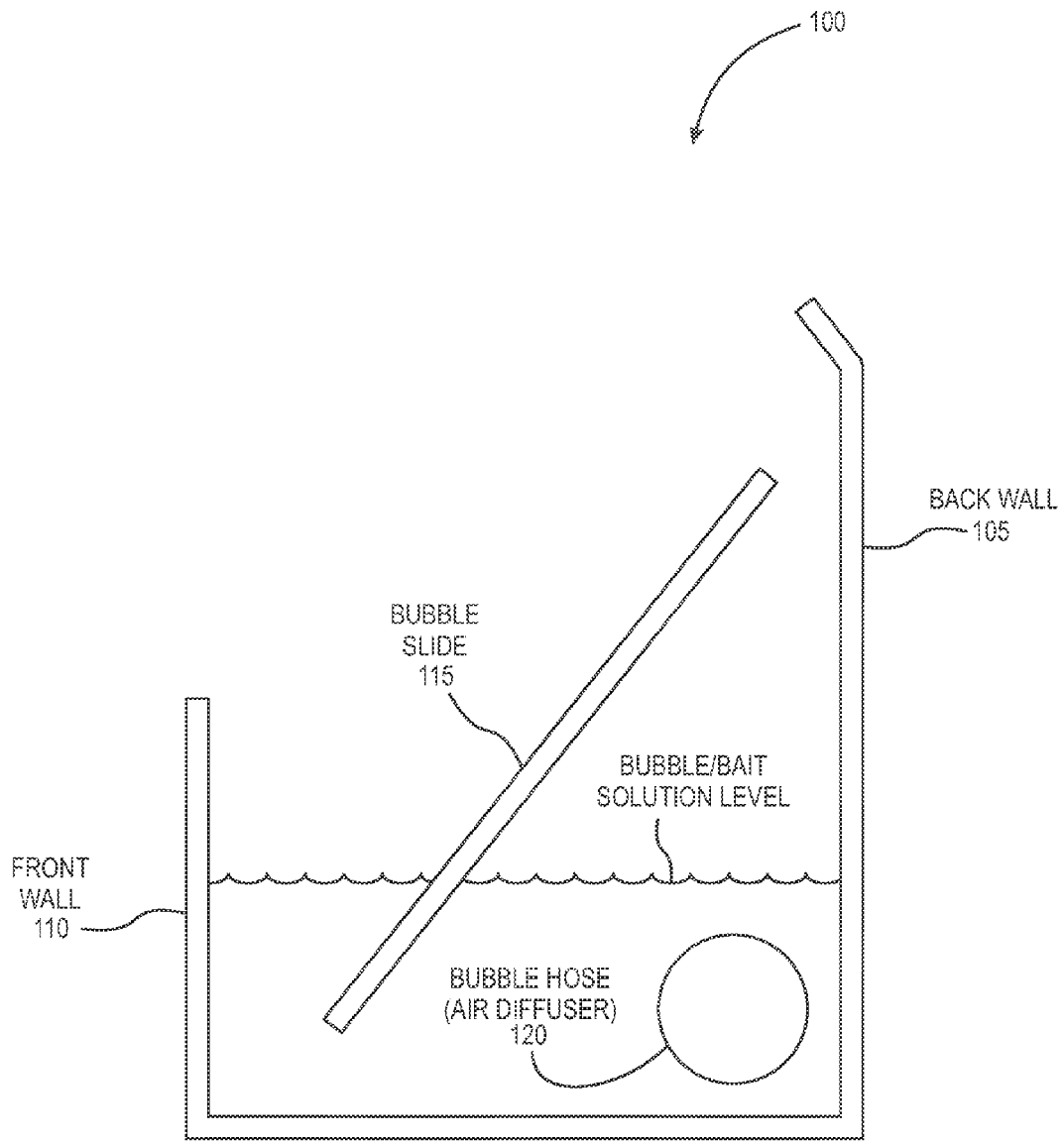
FIG. 1 is a schematic drawing of a fly trap, according to an example embodiment of the present invention.

FIG. 1 shows an example of a "flat trap" 100. In the flat trap example, the bubbles are created between a bubble slide (slanted/angled surface) 115 and a back wall 105 and rise in the space between the bubble slide 115 and the back wall 105. At the top, a lip of the back wall 105 directs the bubbles over the slide 115, which then cascade down the slide 115, where at the bottom of the slide the bubbles pop and join the rest of the bubble/bait solution to continue the cycle. The bubbles are created using an air pump (not shown) and hose/conduit to transfer the air and an air diffuser, such as an air stone, 120.

Figure 3:
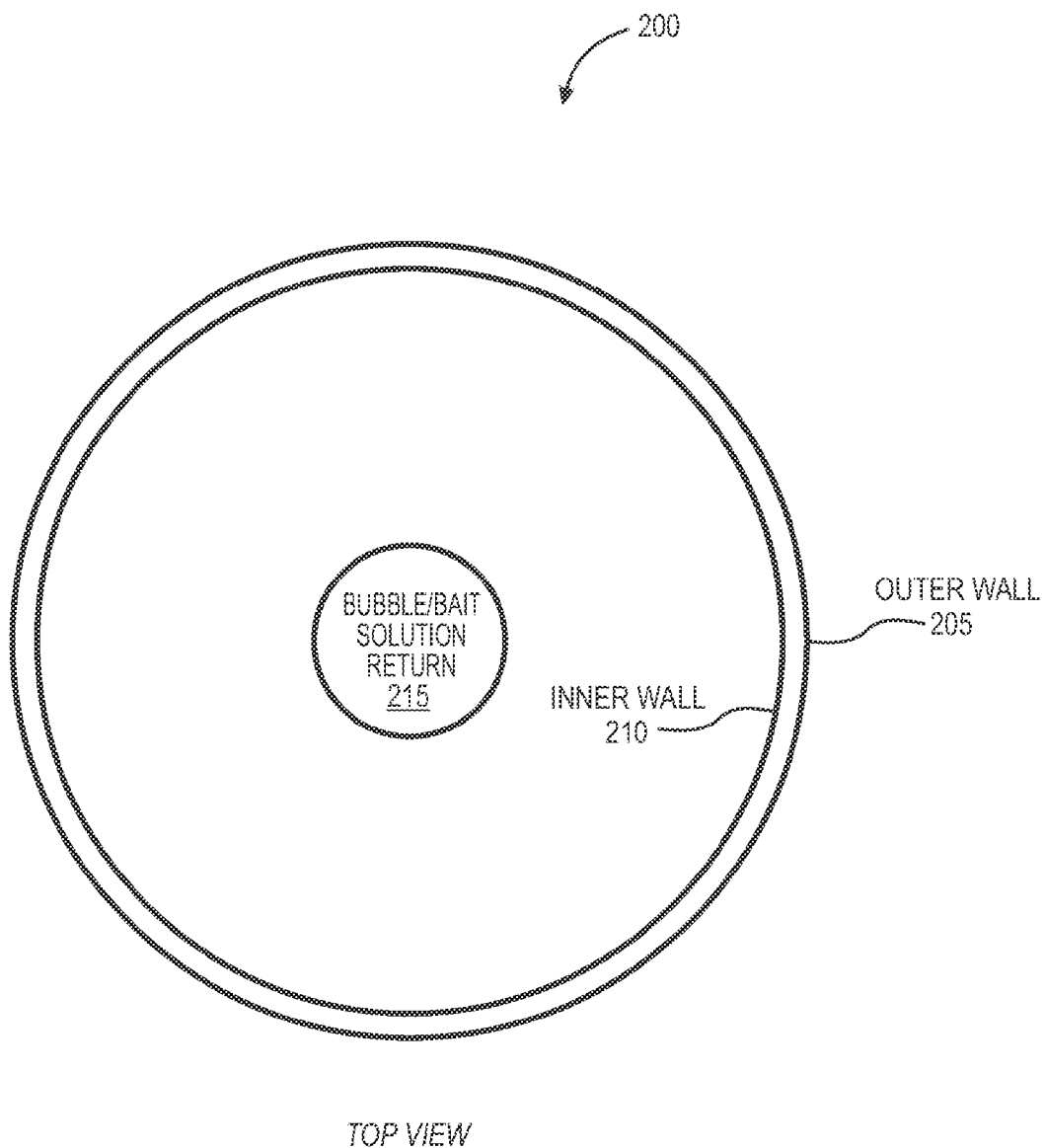
FIG. 3 is a schematic drawing of the fly trap of FIG. 2 viewed from the top.

FIG. 2 shows an example of a "round trap" 200. In the round trap example, the bubbles are created and rise between an outer wall 205 and inner wall 210. The bubbles follow the space between the outer wall 205 and inner wall 210 to the top, where a bent lip of the outer wall 205 directs the bubbles into the center, where the bubbles cascade down within the inner wall 210, where at the bottom, the bubbles join the rest of the bubble/bait solution in a solution return 215. The example trap 200 also includes an air pump 220, one or more air supply conduits 225a,b, and air stones 230a,b. The example trap 200 also includes a screen 235 to retain any captured flies below the screen 235. The screen 235 includes a hole in its center through which the inner wall 210 extends to create the solution return 215. FIG. 3 shows the "round trap" of FIG. 2 from a top view.

In both the flat and round examples, as the flies land on the cascading wall of bubbles, the bubbles pop, entrapping the flies in the cascading bubble wall, which continues back to the bubble/bait reservoir, where the fruit flies drown and are collected until the trap is rinsed. The example traps may include three components: a bait/bubble solution, an air pump scaled to the size of the trap and connected to an air stone or other device for bubble formation, and a collection area. Use of an air stone, in one example, creates many small bubbles that are directed in a manner that creates a wall of bubbles available for the flies to land on, which returns to the collection area depositing the flies. The air pump may be scaled to the size of the trap in order to provide a sufficient volume of air to the air stones or bubble hoses for proper bubble formation. The bait/bubble solution may contain an attractant to draw flies to the trap. Additional ingredients may be added to the bubble bait solution to create bubbles that last long enough to create the bubble wall but then will pop easily when the flies land on the bubbles and when the bubbles rejoin the remaining solution. One example solution may include water, apple cider vinegar, and a drop of dish soap.

The flat trap example can be made in specific sizes or can be manufactured in a modular/cut-to-fit manner enabling an installer to install a trap along the whole length of a wall, for example, in locations with large fruit fly problems. The flat trap example can also include a drain valve, allowing easy cleaning if mounted on a wall. The round trap example can fit nicely among liquor bottles on a shelf of a bar or restaurant, or on a countertop in a residence. The round trap example may be made in two parts, such that the inner structure slides out for easy cleaning Both design examples can incorporate light as an attractant by making the outer walls opaque, and the bubble slide and/or inner walls translucent, and adding a light source. This illuminates the bubble wall to add to its attractant nature. Both design examples can include additional features designed to aid in popping the bubbles where the cascading bubble wall joins the rest of the solution. Such additional features may include additional structures, moving parts, or spraying water.

Figure 4:
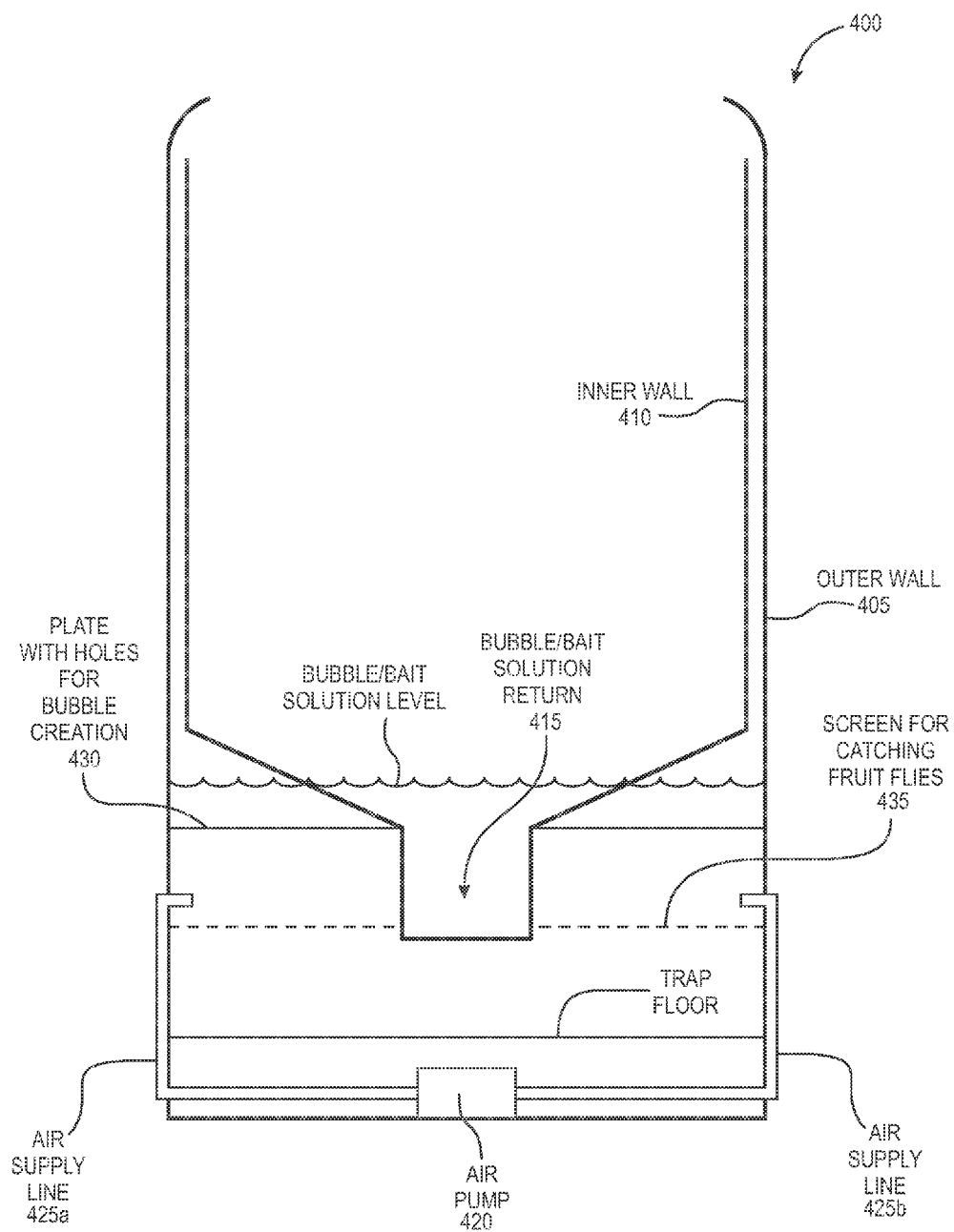
FIG. 4 is a schematic drawing of a fly trap, according to another example embodiment of the present invention.

FIG. 4 is a schematic drawing of a fly trap 400, according to another example embodiment of the present invention. The example trap 400 includes an outer wall 405 containing a solution, an inner wall 410 extending into the solution, and a space formed between the outer wall 405 and the inner wall 410. The example trap 400 also includes an air pump 420 and one or more air supply conduits 425a,b that supply air from the air pump 420 to the solution. As in the above examples, the air forms bubbles in the solution that rise in the space formed between the outer wall 405 and the inner wall 410 and that cascade downward within the inner wall 405 and into the solution at the solution return 415. The trap 400 also includes a plate 430 having holes through which the air from the air supply conduits 425a,b moves and becomes multiple bubbles. The plate 435 aides in the creation of multiple evenly distributed bubbles. The example trap 400 also includes a screen 435 for retaining any captured flies below the screen 435. The screen 435 includes a hole in its center through which the inner wall 410 extends to create the solution return 415.

Figure 5:
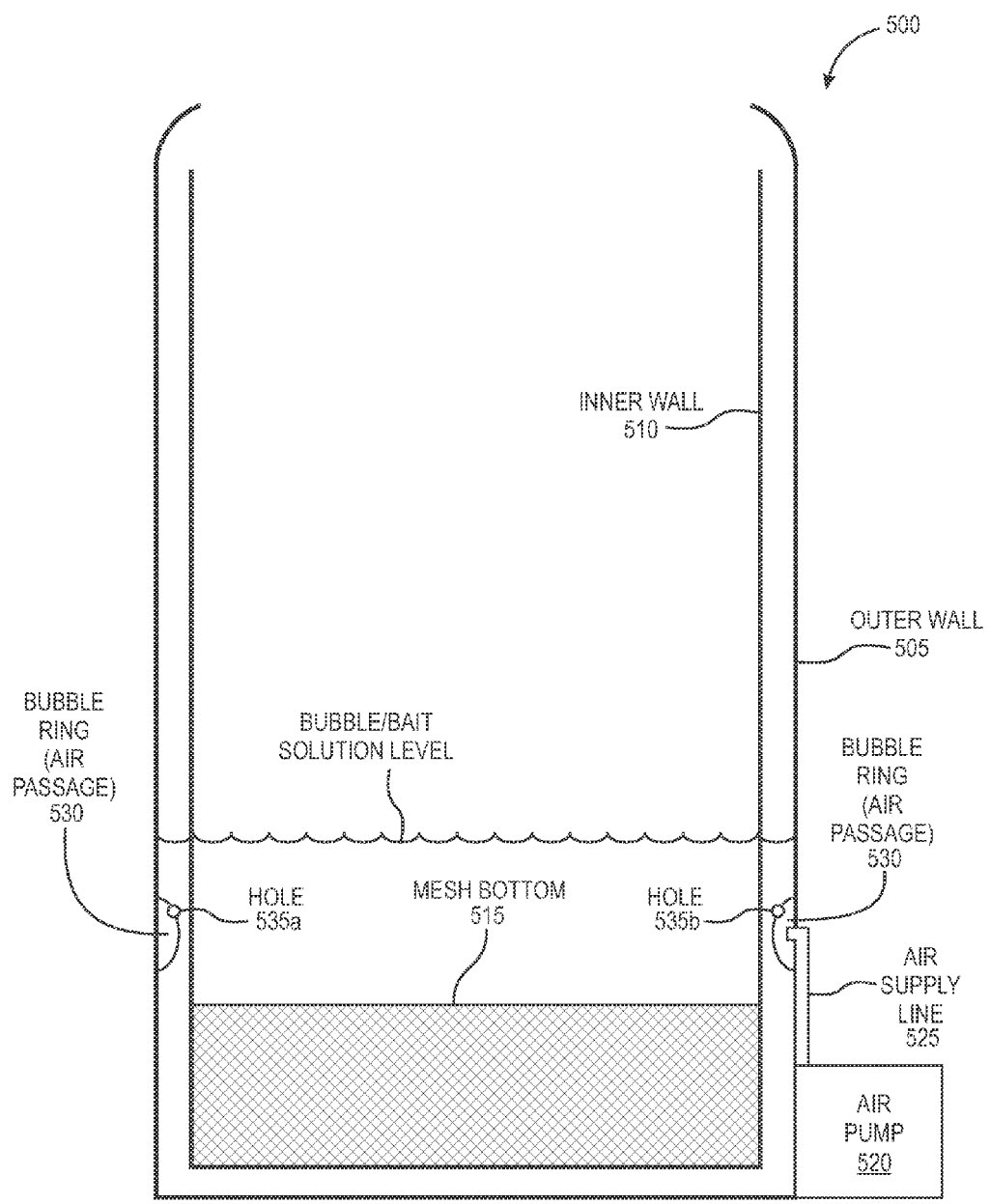
FIG. 5 is a schematic drawing of a fly trap, according to another example embodiment of the present invention.

FIG. 5 is a schematic drawing of a fly trap 500, according to another example embodiment of the present invention. The example trap 500 includes an outer wall 505 containing a solution, an inner wall 510 extending into the solution, and a space formed between the outer wall 505 and the inner wall 510. The example trap 500 also includes an air pump 520 and an air supply conduit 525 that supplies air from the air pump 520 to the solution. As in the above examples, the air forms bubbles in the solution that rise in the space formed between the outer wall 505 and the inner wall 510 and that cascade downward within the inner wall 505 and into the solution at the solution. The trap 500 also includes a bubble ring (an air passage) 530 having holes through which the air from the air supply conduit 525 exits the bubble ring 530 and becomes multiple bubbles. The bubble ring 530 aides in the creation of multiple evenly distributed bubbles. The example trap 500 also includes a mesh layer 515 that can retain any captured flies at the bottom of the trap 500.

While the invention has been particularly shown and described with references to example embodiments thereof, it will be understood by those skilled in the art that various changes in form and details may be made therein without departing from the scope of the invention encompassed by the appended claims. For example, traps can take different shapes than disclosed herein, but operate in a similar fashion as described above. Variations in bubble/bait solution can allow the trap to be effective on flying pests besides fruit flies, including mosquitoes and bees, for example. Further, while one or two air supply conduits have been shown in the above examples, any number of air supply conduits may be used.

What is claimed is:

1. A fly trap, comprising:
an outer wall containing a solution;
an inner wall extending into the solution;
a space formed between the outer wall and the inner wall;
an air pump; and one or more air supply conduits configured to supply air from the air pump to the solution, the air forming bubbles in the solution that rise in the space formed between the outer wall and the inner wall and that cascade downward within the inner wall and into the solution.

2. A fly trap as in claim 1 further comprising one or more air stones coupled to the ends of the one or more air supply conduits and located within the solution, the air stones configured to aide in forming the bubbles.

3. A fly trap as in claim 1 further comprising a plate located within the solution and above the ends of the one or more air supply conduits, the plate including multiple holes configured to aide in forming the bubbles.

4. A fly trap as in claim 3 wherein the plate includes a hole through which the lower end of the inner wall extends to allow captured flies to be deposited in the solution.

5. A fly trap as in claim 1 further comprising an air passage coupled to an end of the one or more air supply conduits, the air passage running around the perimeter of the outer wall in the space formed between the outer wall and the inner wall, the air passage including multiple holes configured to aide in forming the bubbles.

6. A fly trap as in claim 1 further comprising a screen located in the solution above the lower end of the inner wall and below the ends of the one or more air supply conduits, the screen being configured to retain captured flies below the screen.

7. A fly trap as in claim 6 wherein the screen includes a hole through which the lower end of the inner wall extends to allow the captured flies to be deposited below the screen.

8. A fly trap as in claim 1 further comprising a mesh layer located at the bottom of the solution, the mesh layer being configured to retain captured flies at the bottom of the solution.

9. A fly trap as in claim 1 wherein the outer wall extends above the inner wall and is angled toward the inner wall to direct bubbles rising in the space formed between the outer wall and the inner wall toward the inner wall.

10. A fly trap as in claim 1 wherein the outer wall and the inner wall are cylindrically shaped.

11. A fly trap, comprising:
a container with a solution therein;
a wall at one end of the container;
an angled surface located within the container and extending into the solution;
a space formed between the wall and the angled surface;
an air pump; and
one or more air supply conduits configured to supply air from the air pump to the solution, the air forming bubbles in the solution that rise in the space formed between the wall and the angled surface and that cascade downward along the angled surface and into the solution.

* * * * *